Nov. 25, 1969  R. BARRADELL-SMITH ET AL  3,480,160

STACKING GLASS SHEETS

Filed Oct. 26, 1967  4 Sheets-Sheet 1

Inventors
Richard Barradell-Smith
James Edward Hall
James Roby
By
Morrison, Kennedy & Campbell
Attorneys

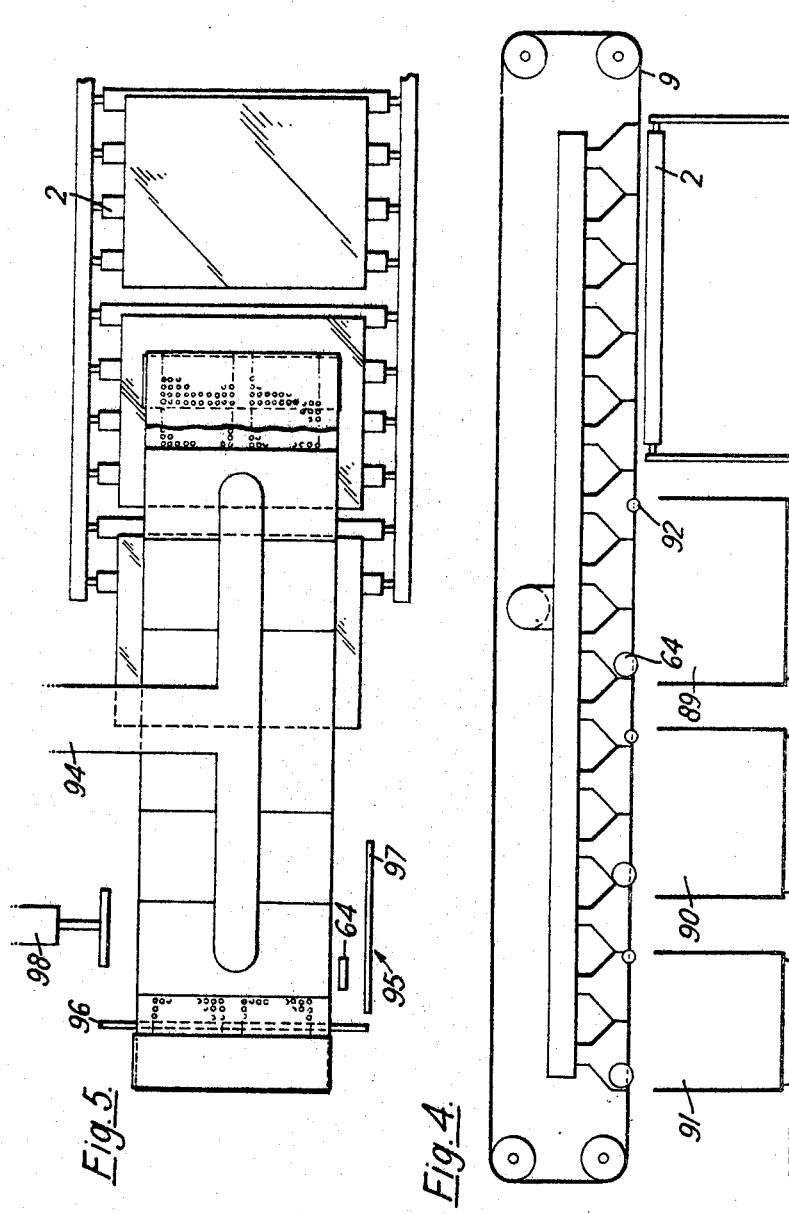

United States Patent Office 3,480,160
Patented Nov. 25, 1969

3,480,160
STACKING GLASS SHEETS
Richard Barradell-Smith, St. Helens, James Edward Hall, Billinge, near Wigan, and James Roby, Orrell, near Wigan, England, assignors to Pilkington Brothers Limited, Liverpool, England, a corporation of Great Britain
Filed Oct. 26, 1967, Ser. No. 678,333
Claims priority, application Great Britain, Oct. 26, 1966, 48,075/66
Int. Cl. B65g 57/11; B65h 29/24, 29/32
U.S. Cl. 214—6
5 Claims

ABSTRACT OF THE DISCLOSURE

Glass sheets are transferred from a conveyor to a stacking station by retaining the sheets in contact with a movable suction member from which the sheets are prised when above the stack of sheets being formed.

BACKGROUND OF THE INVENTION

The present invention relates to methods of moving material in sheet form and apparatus therefor.

The main object of the present invention is to provide an improved method and apparatus for moving material in sheet form from a first position to a second position, for example for removing glass which has been cut into sheet form from a conveyor and forming a stack of glass sheets ready for packaging and dispatching.

SUMMARY

In accordance with the present invention, there is provided a method of transferring sheet material from a first position to a second position, comprising the steps of applying a substantially reduced pressure to the upper surface of a sheet of material to cause the sheet material in the first position to adhere to a movable suction member, retaining the sheet material in contact with the said movable suction member by maintaining a reduced pressure against the upper surface of the sheet material whilst moving the sheet material towards the second position, and then mechanically prising the glass sheet from the movable suction member to open the upper surface of the glass sheet to atmosphere thereby ensuring that the glass sheet falls to the desired second position.

Advantageously in accordance with the present invention, the suction applied to the upper surface of a glass sheet is sufficient to lift the glass sheet from the first position and bring the glass sheet into contact with the movable suction member.

The present invention further provides a method of stacking glass in sheet form, comprising the steps of applying a reduced pressure to the upper surface of glass sheets which are being advanced on a conveyor following a cutting operation to lift the cut glass sheets into contact with a movable suction member, retaining the glass in contact with the said movable suction member by continued application of a reduced pressure to the upper surface of the glass whilst moving the glass towards a position in which the glass sheets are to be stacked, removing the reduced pressure from the upper surface of the glass, and then positively separating the glass sheets one at a time from the movable suction member so that the glass sheets fall in succession to constitute a stack in the second position.

The method of the present invention is advantageously used at the output end of a process in which a ribbon of glass is manufactured and then the ribbon of glass is cut into glass sheets, for example of such a size that a number of glass sheets are cut from the width of the ribbon.

The movable suction member which is employed in accordance with the present invention may be one or more perforated belts, preferably one endless perforated belt.

The continuous movable suction member or belt may be moved transversely to the direction of movement of the conveyor upon which the glass is cut into sheets. Alternatively the continuous movable suction member is arranged to lift the glass sheets from the conveyor and move them to a stacking station which lies in a continuation of the line of advance of the glass sheets on the conveyor.

Desirably the movable suction member is moved continuously over the conveyor and the reduced pressure is applied intermittently to the upper surface of the glass on the conveyor to lift cut glass sheets from the conveyor for transfer to the stacking position.

The method of the present invention is operable with a single stacking station or with a number of stacking stations, in which latter case, the glass is separated from the suction member at a selected one of a number of stacking positions, depending on the size of the sheets. In order to obtain alignment of the glass sheets as they are stacked, the stack of glass sheets is advantageously formed at a slight angle to the horizontal. Such alignment is achieved by providing in the stack a flat integer to which the glass sheet will fall, and this flat integer will be the uppermost glass sheet in the stack once the stack has begun to be formed. Consequently as a glass sheet falls to the top of the stack, it will adopt a position in which a cushion of gas between the falling glass sheet and the flat uppermost surface of the stack is parallel-sided, with the result that the falling glass sheet will be directed by gravitational force down an incline corresponding to the angle to the horizontal adopted by the flat glass sheet at the top of the stack. The gravitational force thus directs the falling glass sheet to a predetermined position so that the consecutive glass sheets are stacked in exact alignment in at least one direction.

If desired, the movable suction member may be maintained at a slight angle to the horizontal similar to the angle of the solid surface at the top of the stack, so that the glass sheets fall at the desired angle and the cushion of gas between the falling glass sheet and the solid surface at the top of the stack is parallel-sided without any adjustment of the glass sheet taking place during falling.

In a further embodiment of the present invention, the squaring up of the glass sheets as they form the stack is achieved using a reciprocable member, for example a pneumatic jack, adjacent one side edge of the glass sheet, and a fixed side member, or a second reciprocable member, on the other side of the glass sheets against which each glass sheet is aligned. The reciprocable member is actuated to be moved clear of one side edge of the glass sheet before the glass sheet is mechanically separated from the underside of the perforated belt, and then immediately after the separation of the glass sheet the member is actuated in the opposite direction to force the glass sheet against the fixed side member or stop. Advantageously the reciprocable member and the side member or stop are adjustable in accordance with the size of the glass sheet which is being stacked.

When glass sheets are stacked together, it is desired to provide some interleaving material to reduce or eliminate the possibility of damage through contact of one glass sheet with another, and this may be done in accordance with the present invention by injecting a particulate material, for example wood flour, into the area in which the stack of glass sheets is formed so that the particulate material is present between adjacent glass sheets in the stack.

Alternatively, the glass sheets may be stacked with wood flour between them by causing wood flour to adhere to the lower surface of each glass sheet as it is advanced in contact with the movable suction member.

Further according to the invention the falling glass sheets are located in a precise position so that an exactly aligned stack is formed, each glass sheet is detected as it falls onto the stack, and said detection is used to lower the support for the stack so that each glass sheet falls the same predetermined distance onto the stack.

It is preferred to maintain the suction throughout the operation, and the glass sheets are then positively separated from the belt by a separating member which forces the glass sheet away from the belt, thereby permitting the atmosphere to enter the perforations in the belt. Alternatively the reduced pressures may be applied and released as desired and in accordance with the advance of each glass sheet retained in contact with the belt by suction. The method then includes the steps of sensing each advancing lifted glass sheet as it approaches the position at which it is to be stacked, and using an indication of the sensed glass sheet to cause the application of suction to the lifted glass sheet to cease.

The present invention also comprehends apparatus for transferring sheet material from a first position to a second position, comprising movable perforated belt means, arranged to be moved over said first and second positions, suction means for applying a reduced gas pressure to that side of the perforated belt means which is remote from said sheet material at said first position, said second position, and intermediate said first and second positions, whereby a sheet of material may be brought into suction contact with the underside of the perforated belt means at said first position and retained in contact therewith during movement from the first position to the second position, and a separating device for mechanically prising the leading edge of the sheet of material away from the underside of the perforated belt means at said second position.

Further the present invention comprehends apparatus for stacking glass in sheet form, comprising a movable perforated endless belt arranged to be moved at a predetermined distance above glass in sheet form which is advanced along a conveyor and also arranged to pass over a stacking station at which glass sheets are to be stacked, suction means for applying a substantially reduced gas pressure to that side of the belt which is remote from the said conveyor at positions above said conveyor, above a stacking station, and intermediate said conveyor and said stacking station, so that glass in sheet form may be lifted from the conveyor into contact with the underside of the belt, and a separating device for peeling the leading edge of the glass sheet away from the underside of the belt above the stacking station.

As already indicated, the suction may be applied continuously, but if it is desired to release the suction preparatory to separating the glass sheet from the underside of the belt, the suction means will be independent suction means arranged to be operated respectively above the conveyor, above the stacking station and intermediate the conveyor and the stacking station, and there will be additionally provided sensing means for detecting the leading edge of a glass sheet as it is advanced from a position over the conveyor to a position near or over the stacking station, and switch means responsive to said sensing means for cutting off the reduced gas pressure from the suction means above the stacking station. In order to give full freedom of maneuver, separate switch means may be arranged to operate the suction means over the conveyor as desired.

Advantageously the movable perforated endless belt has substantially imperforate edge portions and a substantially imperforate central portion.

In general it is desirable that the glass sheets as they are stacked shall each drop vertically into contact with the glass sheet immediately beneath them so that scratching of the surfaces of adjacent glass sheets is avoided.

According to one arrangement in accordance with the invention, this desirable objective is achieved by providing at the stacking station a member for engaging the leading edge of each glass sheet which is separated from the underside of the belt and further providing a gas discharge nozzle for directing gas at the trailing edge of the glass sheet after the glass sheet has been separated from the belt, whereby immediate dissipation of the cushion of gas between the falling glass sheet and the stack is prevented, and the leading edge of the glass sheet is returned against the member after any rebound therefrom.

Additionally the stacking station may include a side member for locating the side edge of each glass sheet, and there may be provided a further gas discharge nozzle for directing a gas jet against the side edge of the glass sheet after it has been separated from the underside of the belt to supply the gas cushion between the falling sheet and the stack and to return the side edge of the glass sheet into contact with the side member in the event of rebound therefrom, so that all the glass sheets are stacked in exact alignment.

Alternatively, instead of the gas discharge nozzles for directing gas jets to control the stacking, this may be achieved by forming the stack itself at a slight angle to the horizontal in the manner previously mentioned. The control of the stacking in this way is facilitated by inclining the endless belt in one or more directions so that a glass sheet separated therefrom engages a positioning member.

According to this aspect of the invention, the stacking station desirably includes a member for engaging the leading edge of each glass sheet which is separated from the underside of the belt, and the endless belt is inclined downwardly in the direction in which the belt advances each glass sheet, so that the glass sheet, after being separated from the belt, will advance under gravity into contact with said member before falling onto the stack.

Additionally, the stacking station advantageously further includes a side member for engaging the side edge of each glass sheet atfer it has been separated from the underside of the belt and the belt is inclined in the direction of said side member transversely to the length of the belt so that each glass sheet after it is separated from the belt will move under gravity into engagement with said side member and a transversely aligned stack of glass sheets is obtained.

Preferably the stacking station further includes a ram for transverse movement against the side of each glass sheet after it has been separated from the underside of the belt to locate each glass sheet in similar position to form a transversely aligned stack of glass sheets.

As already indicated, there may be provided injection means for injecting wood flour either over the top of each glass sheet in the stack, or against the underside of each glass sheet as it is moved while retained in contact with the underside of the belt, so that a layer of wood flour is formed between each glass sheet in the stack, and the possibility of damage of one glass sheet by contact with another in the stacking operation is substantially eliminated.

There may be provided in accordance with the present invention a plurality of stacking stations with an associated plurality of separating devices each arranged for peeling the leading edge of the glass sheet away from the underside of the belt. In this case, the apparatus will further comprise control means for selectively moving one of said separating devices into an operating position in response to an indication of the size of a sheet.

Preferably the apparatus according to the present invention further comprises sensing means for detecting the arrival of a further glass sheet at the top of the stack, said sensing means being arranged, consequent upon such detection, to operate a mechanism to lower the stacking device so that each succeeding glass sheet falls a similar predetermined distance.

BRIEF DESCRIPTION OF THE DRAWINGS

FIGURE 4 is a diagrammatic view indicating an arrangement in which more than one stacking station is used in conjunction with the apparatus of FIGURE 1, and FIGURE 5 is a plan view of apparatus in accordance with the invention in which glass sheets are removed from the conveyor and transferred to a stacking position in continuation of the line of advance of the conveyor.

In the drawings, like reference numerals designate the same or similar parts.

DESCRIPTION OF THE PREFERRED EMBODIMENTS

Figure 1:
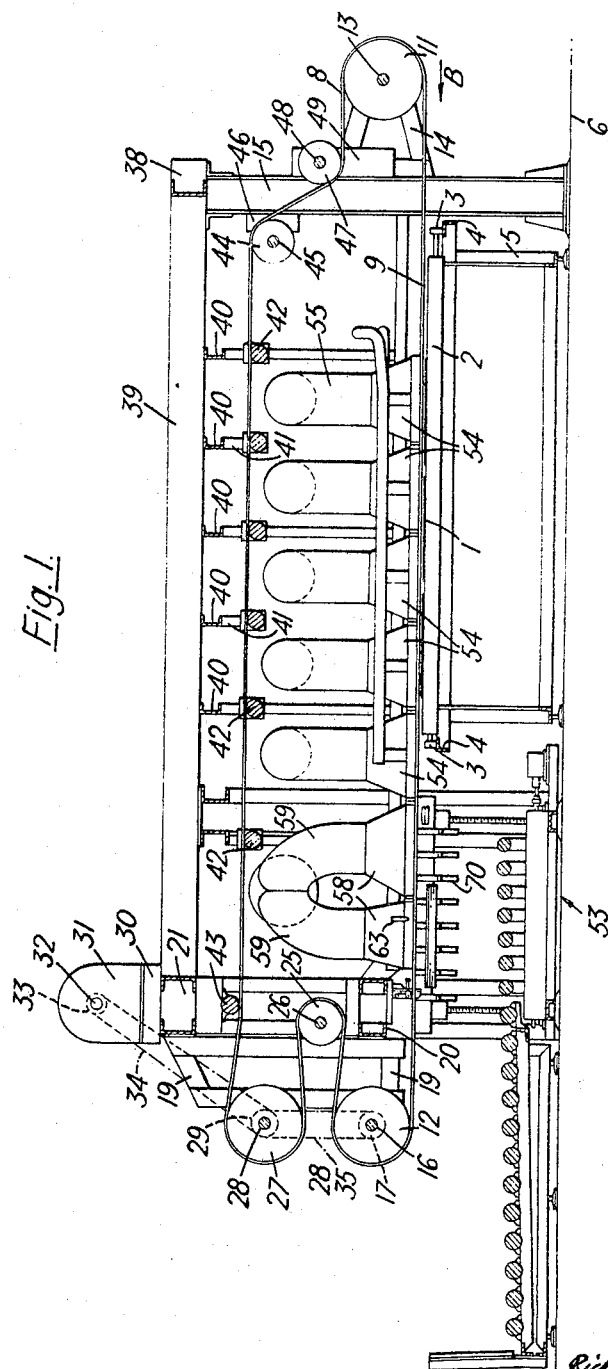
FIGURE 1 is a side elevation of apparatus for stacking glass sheets in accordance with the present invention, and illustrated by way of example.
Figure 2:
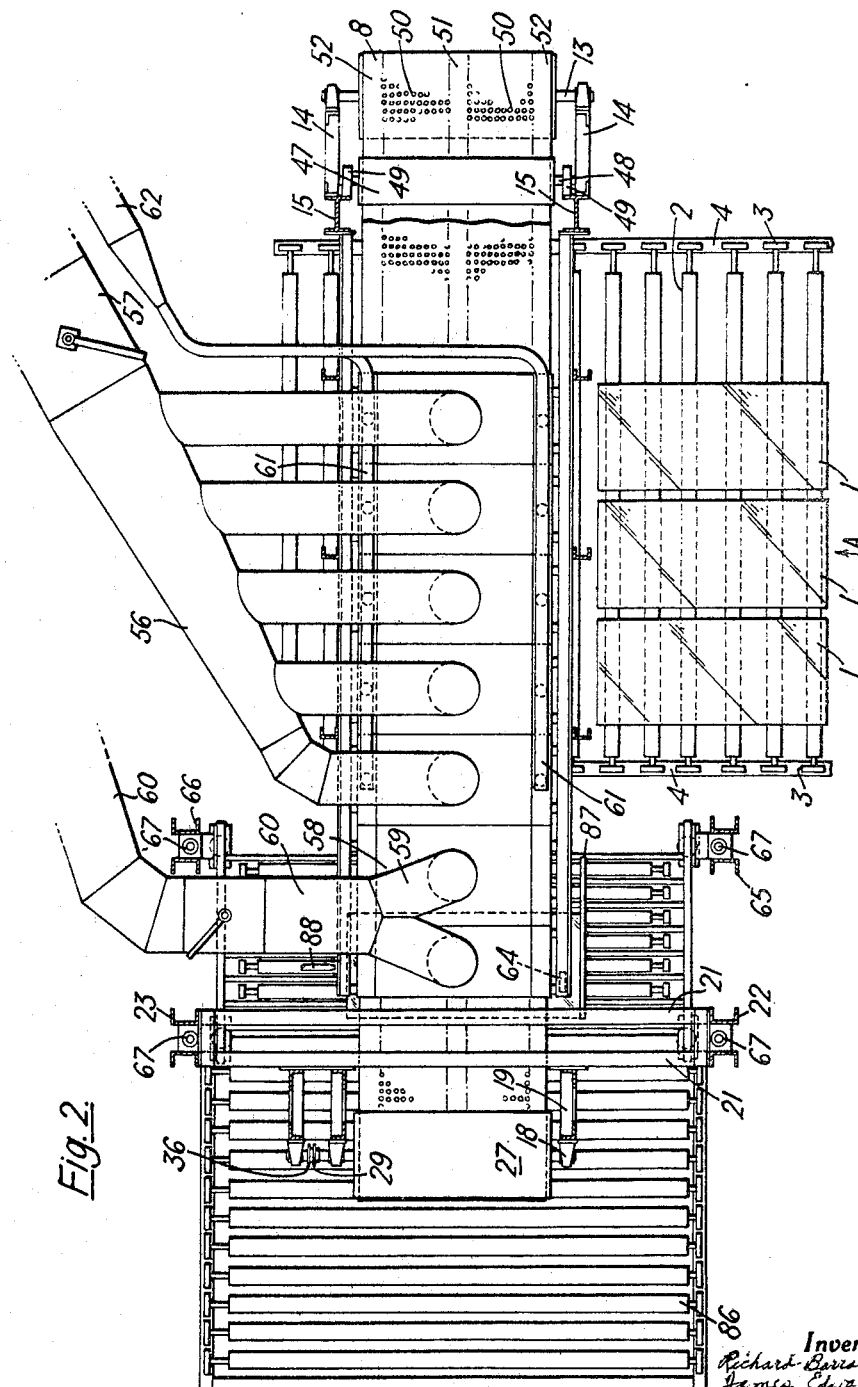
FIGURE 2 is a plan view of the apparatus of FIGURE 1.

Referring to FIGURES 1 and 2 of the drawings glass sheets 1 which have been cut from a continuous ribbon of glass are advanced on a conveyor comprising conveyor rollers 2 mounted in side bearings 3 which are fixed on side beams 4 of the conveyor. The side beams 4 are supported on legs 5 from the shop floor indicated at 6.

The glass sheets 1 are advanced in rows of three sheets of glass at a time arranged side by side on the conveyor rollers 2. The direction of advance of the glass sheets 1 on the conveyor is indicated by a narrow A in FIGURE 2.

Mounted over the conveyor and at right angles to the direction of advance of the conveyor there is a movable perforated endless belt 8. The lower reach 9 of the belt extends between two main rollers 11 and 12. The roller 11 is mounted on its axle 13 in bearings fixed to brackets 14 which are themselves fixed to the upright legs 15 of a bridge structure extending over the conveyor and over a stacking station, which will be described below at which the sheets of glass transported from the conveyor are stacked.

The roller 12 is fixed to an axle 16 which carries a drive sprocket 17. The axle 16 is rotatable in bearings which are mounted on brackets 19 fixed to cross-beams 20 and 21 of the bridge structure. These cross-beams 20 and 21 extend between legs 22 and 23 which also stand on the shop floor 6.

From the roller 12 the belt 8 passes over a jockey roller 25 which is freely rotatable on an axle 26 which is fixed between the legs 22 and 23. The belt then passes over a second driven roller 27 which is fixed to an axle 28 which carries a driving sprocket 29. The roller 27 is carried in bearings on the brackets 19 in similar manner to the mounting of the roller 12. On top of the cross beam 21 there is a platform 30 on which is fixed a driving motor 31 having an output shaft 32 carrying a sprocket 33 which is connected by an endless chain 34 to the driving sprocket 29 on the axle 28 of roller 27. A second endless chain 35 extends between a second sprocket 36 mounted adjacent the sprocket 29 on the axle 28 and the sprocket 17 on the axle 16 of roller 12.

A cross-beam 38 extends between the two legs 15 at the right hand side of the apparatus as illustrated in FIGURES 1 and 2 and joining the cross-beams 21 and 38 there are bridging beams 39 to the undersurface of which are fixed cross struts beams 40 carrying supports 41 for freely rotatable jockey rollers 42. The upper reach of the endless belt 8 passes from the roller 27 beneath a jockey roller 43 which is freely rotatable in bearings fixed under the cross-beams 21 and then over the jockey rollers 42 which depend from the bridging beams 39. These jockey rollers 42 support the upper reach of the belt during its travel to the right hand end of the apparatus. From the jockey rollers 42 the belt passes over a further support roller 44 freely rotatable about an axle 45 which is fixed to blocks 46 carried on the support legs 15.

From the roller 44 the belt passes under an adjustable tensioning roller 47 mounted on an axle 48 which is carried in adjustable bearings indicated generally by the reference 49. After passing beneath the tensioning roller 47 the belt 8 passes around the main roller 11 at the right hand end of the apparatus.

The position of the tensioning roller 47 is adjustable vertically in its bearings 49 so as to maintain the tension in the whole of the belt.

As shown in FIGURE 2, the endless belt 8 is perforated and the perforations 50 through the belt are arranged in two continuous strips extending along the whole length of the belt and separated by an imperforate central band 51. The belt 8 also has imperforate marginal bands 52 which are clearly illustrated in FIGURE 2. The belt 8 may be made of any suitable material for example canvas impregnated with rubber.

The lower reach 9 of the belt which extends between the rollers 11 and 12 passes right over the conveyor and over a stacking station which is indicated generally at 53.

As the belt passes over the conveyor the sheets of glass 1 which have been moved by the conveyor rollers 2 beneath the lower reach 9 of the belt are to be caused to adhere to the belt by suction applied through the perforations in the belt. In order to apply this suction there are provided above the lower reach 9 of the belt a plurality of suction inlets 54 each of which is in the form of a tapered inlet which is connected by a branch suction duct 55 to a main suction duct 56 which is connected through a valve 57, adjustable by means of a handle, to a suction pump. The tensioning of the lower reach 9 of the belt between the rollers 11 and 12 ensures that the mouths of the suction inlets 54 are directly adjacent the upper surface of the endless belt.

Over the stacking station 53 the belt passes over the mouths of suction inlets 58 which are connected by branch ducts 59 to a separate main suction duct 60 which is itself connected through a manually adjustable valve to another suction pump by a continuation of the duct 60.

In operation a row of glass sheets 1 is advanced on the conveyor rollers 2 in the direction of the arrow A until a row of glass sheets 1 is directly beneath the lower reach 9 of the endless perforated belt 8. As the glass sheets 1 become positioned right underneath the lower reach 9 of the belt the leading edges of the sheets operate a switching device, not shown, which is connected in the power supply circuit of the driving motor for the conveyor rollers 2. This switching device stops the conveyor 2 and also acts through a time delay circuit causing the suction fan to apply suction to the duct 56 through the adjusted valve 57 after a predetermined time interval. As a result suction is applied through the mouths of the suction inlets 54 and the suction exerted through these inlets and through the perforations 50 in the belt beneath the inlets 54 corresponds for example to a pressure drop of 12″ to 15″ water gauge. The rapid application of this suction from the very small distance of the undersurface of belt from the sheets of glass 1, for example a distance of approximately ¼″, causes the glass sheets 1 to jump from the conveyor rollers 2 into contact with the undersurface of the belt where they are retained by the suction.

The belt is being driven continuously from the motor 31, and the belt is continuously moving in the direction of the arrow B shown in FIGURE 1.

As the sheets of glass are now adhering to the undersurface of the lower reach 9 of the belt by suction they remain adhering to the belt as the belt passes under the suction inlets 54. After the glass sheets have been lifted into contact with the underside of the belt the suction may be reduced to a pressure drop of the order of 9 to 10″ water gauge, this being sufficient suction to retain the glass sheets against the undersurface of the belt whilst moving the sheets of glass towards the stacking station 53.

In order to assist in maintaining the lower reach 9 of the belt against the mouths of the suction inlets 54 during the traverse of the belt carrying the sheets of glass, suction is also applied to the imperforate marginal bands 51 of the belt through auxiliary suction ducts 61 which extend along the margins of the belt at the sides of the inlets 54. Suction is applied to these marginal suction ducts through a further auxiliary suction duct 62.

As the movement of the belt continues the row of glass sheets which have been picked up from the conveyor are brought in succession over the stacking station 53 and as each sheet approaches the stacking station it becomes held against the lower reach of the belt 9 by the suction applied through the first of the suction inlets 58.

As the leading side edge of the first sheet of glass which leads its movement towards this stacking station, passes beneath the second of the suction inlets 58 over the stacking station, the advance of that edge of the glass sheet is detected by an appropriate sensing device indicated diagrammatically in FIGURE 1 by a gas nozzle 63 which is continuously directing air downwardly towards the lower reach 9 of the belt through an annular aperture surrounding a central opening. The back pressure in the central opening indicates the presence or absence of a sheet of glass held to the belt 9 as it passes beneath the nozzle 18.

The gas nozzle is connected to control means for the suction applied through the duct 60 to the inlets 58 and as long as the absence of a glass sheet held to the belt is indicated by the gas nozzle 18, suction, for example of the order of 9″ water gauge, is continually applied through the duct 60 to the inlets 58. The gas nozzle 63 is located to one side of the belt and is just clear of the lower reach 9 of the belt and detects the leading side edge of a sheet of glass which edge projects just beyond the edge of the belt so that it can intercept the gas flow from the nozzle 18 thereby giving an indication of the presence of the sheet of glass.

Each sheet of glass is prised from the undersurface of the belt at a consistent position over the stacking station by a rubber surface roller 64 which is mounted to one side of the path of travel of the belt over the stacking station. The roller 64 is located so that the leading side edge of the glass sheet adhering to the belt strikes the roller and causes it to rotate. As the sheet is further advanced adhering to the belt the roller 64 presses the glass sheet downwardly so mechanically separating the sheet from the underside of the belt and opening the upper surface of the glass sheet to atmosphere so that the suction is broken and the glass sheet is permitted to fall onto the stack of sheets being built up at the stacking station.

The mechanical prising of each sheet from the belt at a consistent position above the stacking station by means of the roller 64 may be assisted by reduction in the suction applied to the sheet as it is sensed in its passage over the stacking station.

When the gas flow from the nozzle 63 is intercepted by the leading edge of a sheet of glass there is an increase in the back pressure exerted through the central opening of the gas nozzle, this increase is employed to cause the suction control means to remove the suction applied through the duct 60 to the inlets 58 over the stacking station.

This removal of the suction assists the opening of the upper surface of the glass sheet to atmosphere by its being mechanically prised away from the undersurface of the belt so permitting the sheets to fall one after another from a consistent position onto the stack of sheets being built up at the stacking station.

Figure 3:
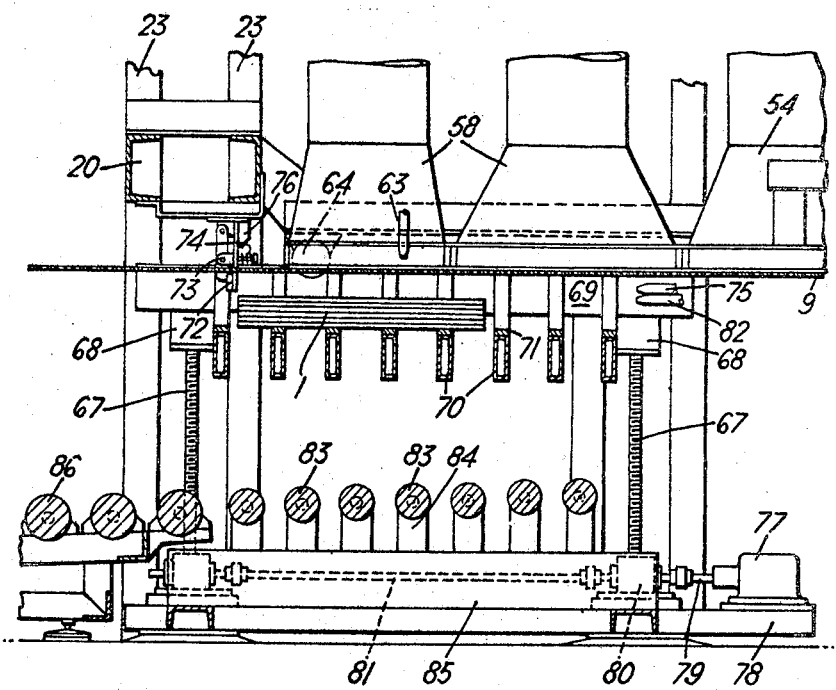
FIGURE 3 is a detailed side view of the stacking apparatus of FIGURES 1 and 2.

The stacking station is illustrated in greater detail in FIGURE 3 and is bounded by four upright legs namely the legs 22 and 23 already described and two further legs 65 and 66. These legs define a space of elongated rectangular shape. Each of the legs is constituted by two U-shaped channel beams located back to back as clearly shown in FIGURE 2 and between each pair of beams there is a vertical screw threaded rod 67 which screws through a nut 68. There are four such nuts 68, one at each corner of the station, and they carry cross-beams 69 between which are mounted support members of a stacking frame constituted by a number of parallel hollow section beams 70 and each of which carries a cushioning strips 71. In FIGURE 3 a number of sheets of glass 1 are shown stacked one above the other on the stacking frame.

As each glass sheet falls from the belt after it has been prised away from the underneath of the belt it still moves forwardly with a velocity component in the direction of advance of the belt and the glass sheet continues to advance until it strikes a pivoted bumper bar which is mounted above a pivot 73 and held in its normal position by the action of a return spring 74. The bumper bar 72 arrests the forward motion of the falling glass sheet so that as the falling sheet drops onto the stack it is located in a precise position and an exactly aligned stack of sheets of glass is produced, as indicated in FIGURE 3. After striking the bumper bar 72 the vertical fall of the glass sheet onto the top of the stack is cushioned by a layer of air trapped between the falling sheet and the top sheet of the stack.

The speed of the perforated belt is so controlled in relation to the weight of the sheets of glass that each glass sheet released from the belt advances and strikes the bumper bar 72 before it drops sufficiently to contact the top glass sheet of the stack. In this way the risk of scratching of the surfaces of the glass sheets is avoided.

In order to control any rebound of the glass sheets from the bumper bar 72 as well as to feed the air cushion between the falling glass sheet and the top sheet of the stack, a gas nozzle 75 is provided underneath the lower reach 9 of the belt pointing towards the trailing side edge of the sheet of glass falling onto the stack. The gas nozzle 75 is lower than the underside of the belt so that gas emitted from the nozzle 75 strikes the trailing side edge of the glass sheet when the sheet has dropped from the underside of the belt and is in contact in the bumper bar 72. The glass sheet is thus maintained against the bumper bar 72 before the gas layer between the falling glass sheet and the top sheet of the stack has been fully evacuated. Gas from the nozzle 75 also serves to enhance the effect of the layer trapped between the falling sheet and the stack so that the falling sheet drops gently onto the top of the stack.

It is preferred that each glass sheet shall drop only a comparatively small distance preferably about 2″ and in order to achieve this the stacking frame is moved downwards vertically after each sheet of glass is received on top of the stack.

The bumper bar 72 acts as a lever pivoting about its pivot 73 and engages a micro-switch 76 which is connected into the control circuit of a motor 77 which is mounted on the base members 78 of the stacking station. The output shaft 79 of the motor 77 is coupled to gearing indicated at 80 which rotates each of the threaded rods 67. The inter-connection of the drives to the rods 67 is indicated at 81 in FIGURE 3.

When the micro-switch 76 is operated by the bumper bars 72 the motor 77 operates to rotate the threaded rods 67 through an angular rotation sufficient to cause the nuts 68 carrying the stacking frame to drop by a distance equal to the thickness of one sheet of glass. The lowering of the stacking frame 70 as each glass sheet is detached from the underface of the belt ensures that the glass sheets all fall through the same distance onto the stack.

A blower 82 is mounted near the nozzle 75, as shown in FIGURE 3, and each time a glass sheet strikes the bumper bar 72 wood flour is blown in the direction of the stack from the blower 82. In this way a film of wood flour is formed on the top of the uppermost sheet of the stack and this film of wood flour ensures that there is no damage of contacting surfaces of the glass sheets in the stack.

At the bottom of the stacking station there are mounted conveyor rollers 83. The rollers 83 are free running and are mounted at their ends on stanchions 84 which are fixed on side beams 85, and which are of graduated height so as to form a downwardly sloping conveyor. The stanchions 84 are each of sufficient height which ensures that the cross members 70 of the stacking frame can enter the interspaces between the rollers 83 so that when the stacking frame is lowered to its lowermost position carrying a stack of glass sheets this stack is transferred to the conveyor rollers 83.

The small angle of incline of the conveyor constituted by the rollers 83 ensures that the stack of aligned sheets of glass taken over by the rollers then moves from beneath the stacking station along continuing conveyor rollers 86 to an unloading station where the stack of sheets can then be crated for transport. If the rollers 83 and 86 are horizontally disposed they are driven in order to move a stack of aligned sheets of glass from beneath the stacking station to the packing and despatching station.

In another arrangement for lowering the stacking frame 70 the micro-switch 76 operates a time delay switch which holds in engagement a clutch between the motor 77 and the drive for lowering the stacking frame. If a glass sheet bounces back from the bumper bar 72 sufficiently to allow the lever to reopen the switch 76 the time delay switch prevents the clutch from being engaged, disengaged and then re-engaged, so that the stacking frame is lowered despite the bouncing of the sheet from the bumper bar. Also when the last glass sheet falls clear of the bumper bar 72 the arrangement is such that the stacking frame continues to be lowered for a fixed period of time to carry the frame members 70 right down below the level of the conveyor rollers 83 so that the stack is transferred to the rollers 83.

In order to locate the glass sheets exactly in two directions at right angles as the stack is formed a side member 87 shown in FIGURE 2 is provided and a gas nozzle 88 at the opposite side of the stacking station pointing towards the side member 87. The nozzle 88 is arranged at a similar distance beneath the underside of the belt 8 to the gas nozzle 75. A jet of gas from the nozzle 88 urges one of the shorter sides of each sheet of glass against the side member 87 before the glass sheet falls into position of the stack.

As an alternative to the gas nozzles 75 and 88 each glass sheet may be exactly aligned against the bumper bar 72 and the side member 87 by inclining the lower reach 9 of the belt at a small angle to the horizontal for example 5° both in the direction of movement of the lower reach of the belt and also transversely to the endless belt. In this the glass sheet floats on the layer of air trapped between the falling sheet and the top sheet of the stack in such a way that it abuts against the bumper bar 72 and the side member 87 as it falls.

In yet another modification of the apparatus the gas nozzles 75 and 88 may be replaced by reciprocable members, conveniently pneumatic rams which move against the sides of the glass sheets to ensure that the sheet is correctly aligned. There may be a ram moving the sheets against the side member 87, and in another arrangement according to the invention the side member 87 itself may be replaced by a further pneumatic ram.

FIGURE 4 shows diagrammatically an apparatus according to the invention in which the lower reach 9 of the endless belt is arranged to pass over the conveyor rollers 2 and to pick up sheets of glass from the conveyor as it passes over those rollers and also passes over a series of three separate stacking stations 89, 90, and 91 which are for receiving glass sheets of different sizes. The larger sheets are stacked at the station 89 and the smaller sheets at the station 91.

Each of these stations has a detecting device 92 which detects the size of a sheet by its engagement with the trailing edge of the sheet held by suction against the belt 9. If for example a sheet of the largest size is detected by the detecting device 92 of the station 89 the separating roller 64 for that station is depressed and the larger sheet is caused to fall onto the stack being formed at the station 89. Each of the other stations has its own detecting device and operates similarly so that cut sheets of glass can be sorted into stacks of different sizes by employing the apparatus of FIGURE 4. The selection may be automatic, or may be effected manually by an operator using a manual switching control. Alternatively one of the stations indicated at 89, 90 and 91 in FIGURE 4 may be a cullet station to which damaged glass sheets are transported under control of the operator, or under control of an automatic device which recognises a damaged sheet and controls the release of that sheet from the suction belt into a cullet bin located at the appropriate station.

A further possibility for the disposal of cullet is for the application of suction to the inlets 54 to be suppressed when damaged sheets are advanced on the conveyor rollers 2, so that cullet is not lifted from the conveyor by the perforated belt, but is carried by the conveyor beyond the belt to the end of the conveyor and then dropped into a cullet bin.

FIGURE 5 shows another modification in which glass sheets 1 cut from a ribbon of glass are advanced on conveyor rollers 2 and at the end of this advance the glass sheets pass beneath a perforated endless belt 8 which is mounted above the conveyor parallel to the direction of advance of the sheets of glass on the conveyor. The lower reach of the endless belt is moving in the same direction as the sheets of glass which are being advanced on the conveyor rollers 2.

Suction is applied continuously to the movable belt through ducting 94 in the same manner as described with reference to FIGURES 1 and 2 and as each glass sheet is advanced under the perforated belt, which is moving at the same speed as the glass sheets on the conveyor 2, the glass sheet is lifted to the belt by means of the suction and is retained adhering to the underside of the belt as it travels forwardly.

The glass sheets retained on the underside of the belt are advanced in continuation of their direction of advance on the conveyor rollers 2 to a stacking station indicated at 95. The stacking station is defined by fixed members 96 and 97 which respectively engage the leading edge of each glass sheet after it has been separated from the underside of the belt by a releasing roller 64, and one side edge of each glass sheet. As the glass sheet falls from the belt it has component of velocity in the direction of advance of the belt and therefore continues to advance and strike the member 96 as it falls. Immediately after the glass is being separated from the belt a reciprocable member indicated as a pneumatic ram 98 is moved against one side of the glass sheet to move the glass into abutment against the side member 97 so that it reaches its properly aligned position as it falls onto the top of the stack. The side member 97 may be replaced by a second pneumatic ram.

In yet another embodiment of the invention insertion pieces may be provided at the stacking station for catching the falling glass sheets. The insertion pieces are moved inwardly pneumatically when the presence of a sheet of glass is sensed by the sensing nozzle 63, and are in the form of thin pieces of a plastics material for example polytetrafluorethylene which move in beneath the sheet of glass which is just being released from the suction belt and catch that sheet and support it while it is squared up into its correct alignment by means of pneumatic rams acting on the side edges of the sheet. Once the glass sheet has been squared up the insertion pieces are quickly withdrawn and the glass in its correctly aligned position is allowed to settle onto the top of the stack.

In a further modification of the stacking station a sensing air jet may be directed across the corner of the falling glass sheets and when this air jet is interrupted by the presence of the corner of a glass sheet the mechanism for lowering the stacking frame by the thickness of one sheet is energized. This operates as an alternative to the lowering of the stacking frame under control of the microswitch operated by the bumper bar.

The conveyor 2 may be modified to include a lifting table which presents the upper surfaces of the glass sheet to the belt which is moving across the suction inlets 54. This arrangement is employed when large and heavy sheets of glass are to be unloaded from the conveyor and stacked. With this arrangement it is only necessary to apply sufficient suction to the inlets 54 to hold the sheets of glass adhering to the belt. With this arrangement for example a suction corresponding to a pressure drop of 5 to 6″ water gauge may be used throughout the transporting of the glass sheets. Each glass sheet is lifted by the lifting table into sealing engagement with the undersurface of the belt and then retained adhering to the belt as it is transported until it is positively separated from the belt by the action of the roller 64.

We claim:

1. Apparatus for stacking glass in sheet form at an accurately determined position on receiving means, comprising a movable perforated belt arranged to be moved at a predetermined position above glass sheets which are advanced along a conveyor and also arranged to pass over a receiving station at which said glass sheets are to be dropped onto receiving means, suction means for applying a substantially reduced gas pressure to that side of the belt which is remote from the said conveyor at positions above said conveyor, above the receiving station and intermediate said conveyor and said receiving station to lift said glass sheets from the conveyor into gripping contact with the underside of the belt for movement by the belt to the receiving station, a separating device comprising at least one roller mounted for rotation about an axis extending transversely of said belt for mechanically prising the leading edge of each glass sheet in turn away from the underside of said belt, the leading edge of said glass sheet passing under said roller and rotating the same, the glass sheet thereby being prised from the underside of said belt to allow said glass sheet to drop onto said receiving means below, and a member for engaging the leading edge of said glass sheet after said leading edge has passed under said roller to prevent further advancing movement of said glass sheet and to accurately determine the position at which said glass sheet drops onto said receiving means.

2. Apparatus according to claim 1, wherein the receiving station includes a member for engaging the leading edge of each glass sheet which is separated from the underside of the belt and there is provided a gas discharge nozzle for directing gas at the trailing edge of the glass sheet after the glass sheet has been separated from the belt, whereby immediate dissipation of the cushion of gas between the falling glass sheet and the stack is prevented, and the leading edge of the glass sheet is returned against the member after any rebound therefrom.

3. Apparatus according to claim 2, wherein the receiving station further includes a side member for locating the side edge of each glass sheet, and there is provided a further gas discharge nozzle for directing a gas jet against the side edge of the glass sheet after it has been separated from the underside of the belt to supply gas to the gas cushion between the falling glass sheet and the stack and to return the side edge of the glass sheet into contact with the side member in the event of rebound therefrom, so that all the glass sheets are stacked in exact alignment.

4. Apparatus according to claim 2, wherein the receiving station further includes a ram for transverse movement against the side of each glass sheet after it has been separated from the underside of the belt to locate each glass sheet in similar position to form a transversely aligned stack of glass sheets.

5. Apparatus according to claim 1, wherein the receiving means comprises a stacking member and means for lowering said member in steps equal to the thickness of the glass sheets being stacked and for raising said member to its initial position, and wherein the apparatus includes sensing means for detecting the arrival of a further glass sheet at the top of the stack, said sensing means being arranged, consequent upon such detection, to operate said lowering means to lower the stacking member one step whereby each succeeding glass sheet falls a similar predetermined distance.

References Cited

UNITED STATES PATENTS

| | | | |
|---|---|---|---|
| 1,107,859 | 8/1914 | Stevens | 271—74 X |
| 2,193,162 | 3/1940 | Carter | 214—6 X |
| 2,476,145 | 7/1949 | Gwyn et al. | 206—62 |
| 2,566,240 | 8/1951 | Mursch | 271—74.1 |
| 2,813,637 | 11/1957 | Perry et al. | 214—6 |
| 2,951,575 | 9/1960 | Gordon et al. | 214—6 X |
| 2,960,242 | 11/1960 | Herr et al. | 214—6 |
| 3,024,921 | 3/1962 | Gaubert | 214—6 |
| 3,132,858 | 5/1964 | Bernard | 214—6 X |
| 3,144,927 | 8/1964 | Buccicone | 214—6 X |
| 3,202,302 | 8/1965 | Insolia | 214—6 X |

OTHER REFERENCES

Gould et al. IBM Technical Disclosure Bulletin, vol. 6, No. 7, December 1963.

GERALD M. FORLENZA, Primary Examiner

R. J. SPAR, Assistant Examiner

U.S. Cl. X.R.

271—74; 198—180